US012393157B2

(12) United States Patent
Park et al.

(10) Patent No.: US 12,393,157 B2
(45) Date of Patent: Aug. 19, 2025

(54) ROTATIONAL FORCE TRANSMISSION STRUCTURE

(71) Applicant: Hewlett-Packard Development Company, L.P., Spring, TX (US)

(72) Inventors: Seungchan Park, Suwon (KR); Junhui Kim, Suwon (KR); Youngkwang Shin, Suwon (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/685,890

(22) PCT Filed: Jan. 5, 2022

(86) PCT No.: PCT/US2022/070030

§ 371 (c)(1),
(2) Date: Feb. 22, 2024

(87) PCT Pub. No.: WO2023/034654

PCT Pub. Date: Mar. 9, 2023

(65) Prior Publication Data

US 2025/0181023 A1 Jun. 5, 2025

(30) Foreign Application Priority Data

Sep. 1, 2021 (KR) ........................ 10-2021-0116309

(51) Int. Cl.

| | |
|---|---|
| ***G03G 15/00*** | (2006.01) |
| ***G03G 21/16*** | (2006.01) |
| ***G03G 21/18*** | (2006.01) |

(52) U.S. Cl.
CPC ....... *G03G 21/1647* (2013.01); *G03G 15/757* (2013.01); *G03G 21/186* (2013.01)

(58) Field of Classification Search
CPC . G03G 15/757; G03G 21/1647; G03G 21/186
See application file for complete search history.

(56) References Cited

U.S. PATENT DOCUMENTS 8,306,460 B2 11/2012 Chadani et al.
9,804,560 B2 10/2017 Sato et al.
(Continued)

FOREIGN PATENT DOCUMENTS

JP 04-069189 A 3/1992
JP 07-293577 A 11/1995
(Continued)

*Primary Examiner* — Sophia S Chen
(74) *Attorney, Agent, or Firm* — Foley & Lardner LLP

(57) ABSTRACT

A cartridge unit detachable from a main body of an image forming device includes: a rotation member; a driven coupler arranged at one end portion of the rotation member in an axial direction of the rotation member; and a coil spring arranged to be expandable and compressible in the axial direction, a first end portion of the coil spring being fixed onto the driven coupler, and the coil spring being wound in a first direction from the first end portion toward a second end portion. When a rotational force is transmitted to the second end portion of the coil spring in the first direction or in a second direction opposite to the first direction, a portion of the transmitted rotational force is converted into a force that decreases or increases a diameter of the coil spring, and the first end portion of the coil spring presses the driven coupler in a direction perpendicular to the axial direction.

15 Claims, 16 Drawing Sheets

(56) References Cited

U.S. PATENT DOCUMENTS

| | | | | |
|---|---|---|---|---|
| 2010/0303503 | A1* | 12/2010 | Woo | G03G 21/186 399/167 |
| 2013/0259544 | A1 | 10/2013 | Ryu et al. | |
| 2019/0018344 | A1 | 1/2019 | Sato | |
| 2019/0179249 | A1 | 6/2019 | Mori et al. | |
| 2020/0033791 | A1 | 1/2020 | Uesugi et al. | |
| 2020/0142345 | A1 | 5/2020 | Mori et al. | |

FOREIGN PATENT DOCUMENTS

| | | | |
|---|---|---|---|
| JP | 2009-244563 | A | 10/2009 |
| KR | 10-2129342 | B1 | 7/2020 |
| WO | 2021/040776 | A1 | 3/2021 |
| WO | 2021/137889 | A1 | 7/2021 |

* cited by examiner

ROTATIONAL FORCE TRANSMISSION STRUCTURE

CROSS-REFERENCE TO RELATED APPLICATIONS

This application is a U.S. National Stage Patent Application under 35 U.S.C. § 371 of PCT/US2022/070030, filed Jan. 5, 2022, which claims priority to Korean Patent Application No. 10-2021-0116309, filed Sep. 1, 2021, which are hereby incorporated by reference in their entireties.

BACKGROUND

An electro-photographic image forming device forms a visible toner image on a photosensitive drum by supplying a toner to an electrostatic latent image formed on a photoconductor. The electro-photographic image forming device transfers the toner image onto a printing medium via an intermediate transfer medium or directly to fuse the transferred toner image onto the printing medium.

In such an electro-photographic image forming device, some components are configured as a cartridge unit, so that they are easily attached to and removed from a main body. The cartridge unit may be implemented in various forms. For example, the cartridge unit may include a photosensitive cartridge including a photosensitive drum, or a developing cartridge including a developing roller, or an imaging cartridge including a photosensitive drum and a developing roller, and the like. The cartridge unit may include a rotation member and a driven coupler configured to rotate the rotation member by receiving a rotational force from the main body.

DETAILED DESCRIPTION

Figure 1:
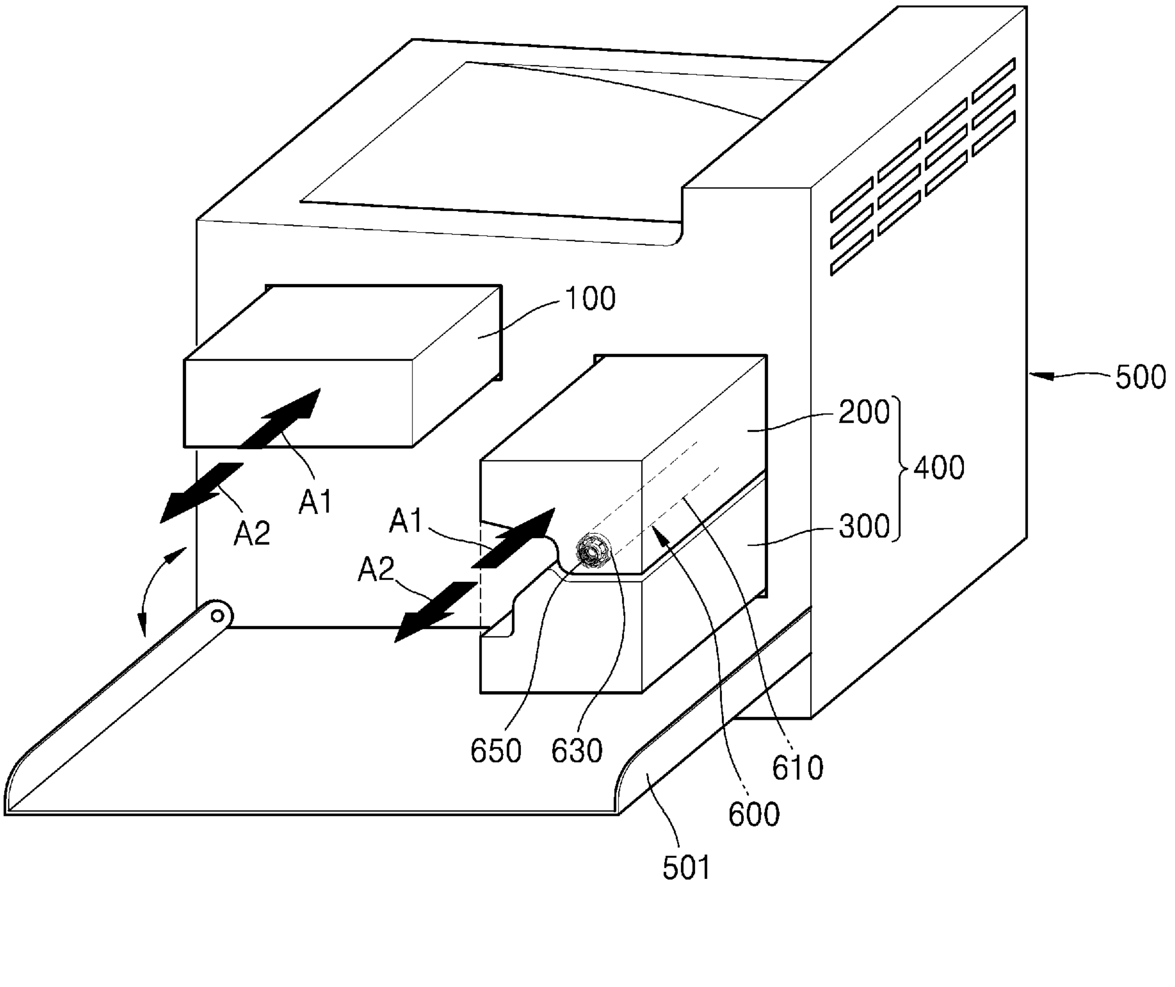
FIG. 1 is a perspective view of an image forming device showing a state in which a cartridge unit is detachable from a main body, according to an example.

In an image forming device, some components may be configured as a cartridge unit and may be detachably attached to a main body. For example, the cartridge unit includes a rotation member such as a photosensitive drum, a developing roller, and the like. The cartridge unit may be mounted or removed in an axial direction of the rotation member.

When mounted on the main body, the cartridge unit is connected to a motor through a coupling structure, and receives rotational force from the motor to rotate the rotation member of the cartridge unit. Examples of the coupling structure may include a driving coupler provided in the main body and a driven coupler provided in the cartridge unit. The driven coupler is coupled to the driving coupler, and receives rotational force from the driving coupler.

In the foregoing examples, a rotational shaft of the driving coupler and a rotational shaft of the driven coupler are arranged coaxially with each other, and the rotational force of the driving coupler may be directly transmitted to the driven coupler. Under actual conditions, due to various causes, such as manufacturing tolerances and assembly tolerances of the driving coupler and the driven coupler, the rotational shaft of the driving coupler and the rotational shaft of the driven coupler may not be coaxially arranged. As a result, a driving force may not be properly transmitted from the main body to the cartridge unit, and in some cases, the coupling structure or a component connected thereto may be damaged. In a cartridge unit and an image forming device according to some examples of the present disclosure, a stable driving force transmission is secured from the main body to the rotation member of the cartridge unit through a rotational force transmission structure using a reduction or increase in a diameter of a coil spring, and the driven coupler and the driving coupler may be coaxially arranged.

Hereinafter, a cartridge unit and an example of the image forming device including the cartridge unit are described in detail with reference to the accompanying drawings. In the present specification and the drawings, constituent elements having substantially the same functions are referenced by the same reference numerals, and thus, redundant descriptions thereof are omitted.

Figure 2:
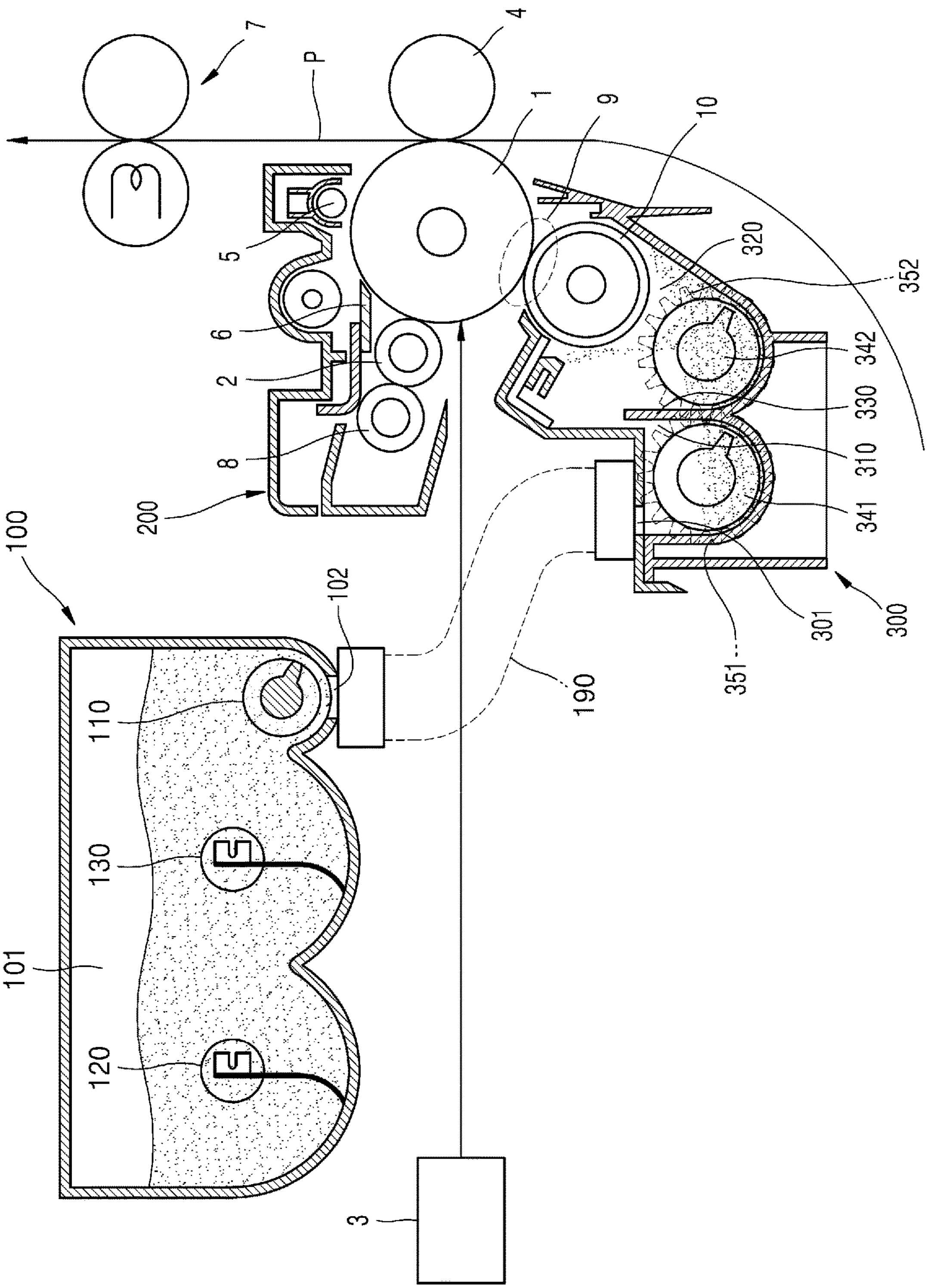
FIG. 2 is a schematic diagram illustrating an electro-photographic image forming device, according to an example.

FIG. 1 is a perspective view of an image forming device showing a state in which a cartridge unit is detachable from a main body, according to an example. FIG. 2 is a schematic diagram illustrating an electro-photographic image forming device, according to an example. The image forming device according to some examples is a monochromatic image forming device configured to employ a two-component developer that contains a toner and a magnetic carrier. A color of the toner is, for example, black.

Referring to FIG. 1, a door 501 of the image forming device may open to partially expose a main body 500 and detachably attach a cartridge unit 600 to the main body 500. The cartridge unit 600 may slide in a mounting direction A1 or a removal direction A2 to be mounted on or removed from the main body 500. The mounting direction A1 and the removal direction A2 may be axial directions of a rotation member provided in the cartridge unit 600.

Referring to FIG. 2, the image forming device on which the cartridge unit 600 is mounted may include a photo scanner 3, a photosensitive unit 200, a developing unit 300, a transfer device, and a fusing device 7.

The photosensitive unit 200 includes a photosensitive drum 1 and a charging roller 2 configured to rotate. The photosensitive drum 1 is an example of a photoconductor on which an electrostatic latent image is formed. The charging roller 2 is an example of a charging machine configured to charge a surface of the photosensitive drum 1 to a uniform surface potential. The charging roller 2 is configured to be in contact with the photosensitive drum 1 to rotate, and a charging bias voltage is applied to the charging roller 2. The photosensitive unit 200 may further include a cleaning roller 8 configured to remove foreign matters from a surface of the charging roller 2 and a cleaning blade 6 configured to remove toner remaining on the surface of the photosensitive drum 1. A static eliminator 5 configured to remove residual potentials on the photosensitive drum 1 may be arranged upstream of the cleaning blade 6 with respect to a rotational direction of the photosensitive drum 1. The static eliminator 5 may irradiate light onto the surface of the photosensitive drum 1, for example.

The photo scanner 3 irradiates the surface of the charged photosensitive drum 1 with light corresponding to image information to form an electrostatic latent image. The developing unit 300 mixes and stirs the toner and the carrier, and supplies the toner to the electrostatic latent image formed on the photosensitive drum 1 to form a visible toner image on the surface of the photosensitive drum 1. The developing unit 300 may include a developing roller 10 configured to supply the toner to the photosensitive drum 1 while rotating, and an agitation member configured to stir and convey a developer. The agitation member may include a first agitator 341 and a second agitator 342. The agitation member may be connected to gears 351 and 352 configured to transmit a rotational force.

An inner space of the developing unit 300 may be divided into an agitation chamber 310 and a developing chamber 320 parallel to each other. The first agitator 341 is installed in the agitation chamber 310. The developing roller 10 and the second agitator 342 are installed in the developing chamber 320. The agitation chamber 310 and the developing chamber 320 are separated from each other by a partition wall 330 extending in an axial direction of the developing roller 10. In a case where the first agitator 341 rotates, the developer in the agitation chamber 310 is conveyed in the axial direction (first direction) by the first agitator 341, and conveyed to the developing chamber 320 through an opening provided near one end portion of the partition wall 330. The developer in the developing chamber 320 is conveyed in a second direction opposite to the first direction by the second agitator 342, and conveyed to the agitation chamber 310 through an opening provided near the other end portion of the partition wall 330. Therefore, the developer is circulated along the agitation chamber 310 and the developing chamber 320, and supplied to the developing roller 10 in the developing chamber 320 during a circulation process.

The developing roller 10 conveys the developer including the toner and the carrier to a developing area 9 facing the photosensitive drum 1. The toner is attached to the carrier by electrostatic force, and the carrier is attached to a surface of the developing roller 10 by magnetic force. As a result, a developer layer is formed on the surface of the developing roller 10. The developing roller 10 may be arranged apart from the photosensitive drum 1 by a developing gap. The developing gap may be set on the order of several tens to several hundreds of micrometers. The toner is moved from the developing roller 10 to the photosensitive drum 1 by a developing bias voltage applied between the developing roller 10 and the photosensitive drum 1, and a visible toner image is formed on the surface of the photosensitive drum 1.

A transfer roller 4 is an example of a transfer mechanism configured to transfer the toner image formed on the photosensitive drum 1 to a printing medium P. The transfer roller 4 faces the photosensitive drum 1 to form a transfer nip, and a transfer bias voltage is applied to the transfer roller 4. The toner image developed on the surface of the photosensitive drum 1 is transferred to the printing medium P by a transfer electric field formed between the photosensitive drum 1 and the transfer roller 4 by the transfer bias voltage. A corona transfer mechanism using corona discharge may be employed instead of the transfer roller 4.

The toner image transferred to the printing medium P is attached to the printing medium P by an electrostatic force. The fusing device 7 applies heat and pressure to fuse the toner image onto the printing medium P.

If the toner in the developing unit 300 is consumed, a toner may be supplied from a toner container 100 to the developing unit 300. The toner container 100 may include a toner accommodation portion 101 configured to accommodate a toner, and conveyance members 110, 120, and 130 configured to convey the toner of the toner accommodation portion 101 to a toner outlet 102. A toner supply member 190 connects the toner outlet 102 to a toner supply port 301 of the developing unit 300.

The conveyance member 110 conveys the toner to the toner outlet 102. Although not shown in the drawings, the toner container 100 may include a shutter configured to selectively open or close the toner outlet 102.

Referring back to FIG. 1, the image forming device may include at least one detachable cartridge unit 600. The cartridge unit 600 includes at least one rotation member 610. For example, the photosensitive unit 200 may be a photosensitive cartridge that is replaced when the photosensitive drum 1 is used up. The developing unit 300 may be a developing cartridge that is replaced when internal members are used up. The photosensitive unit 200 and the developing unit 300 may be integrally replaceable cartridge units (imaging cartridge 400).

When the cartridge unit 600 is mounted on the main body 500, the cartridge unit 600 is connected to a motor by a coupling structure and receives a rotational force from the motor to rotate the rotation member 610 of the cartridge unit 600, for example, the photosensitive drum 1 of the photosensitive unit 200, the charging roller 2 of the photosensitive unit 200, the developing roller 10 of the developing unit 300, and the like.

The coupling structure may include a driving coupler provided in the main body 500 and a driven coupler 630 provided in the cartridge unit 600. The driven coupler 630 is coupled to the driving coupler, and receives a rotational force from the driving coupler.

Figure 3:
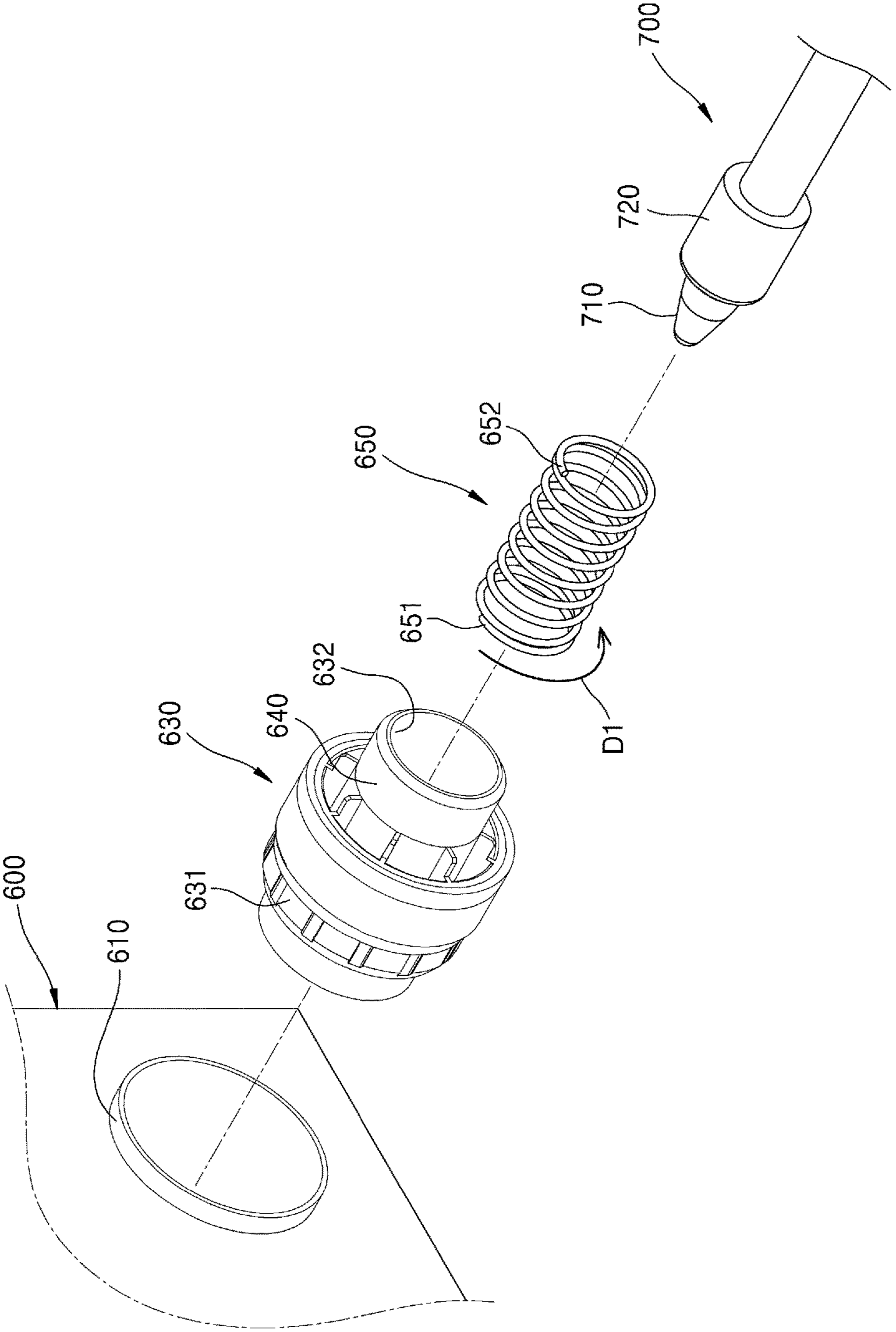
FIG. 3 is a perspective view of a coupling structure, according to the present example.
Figure 4:
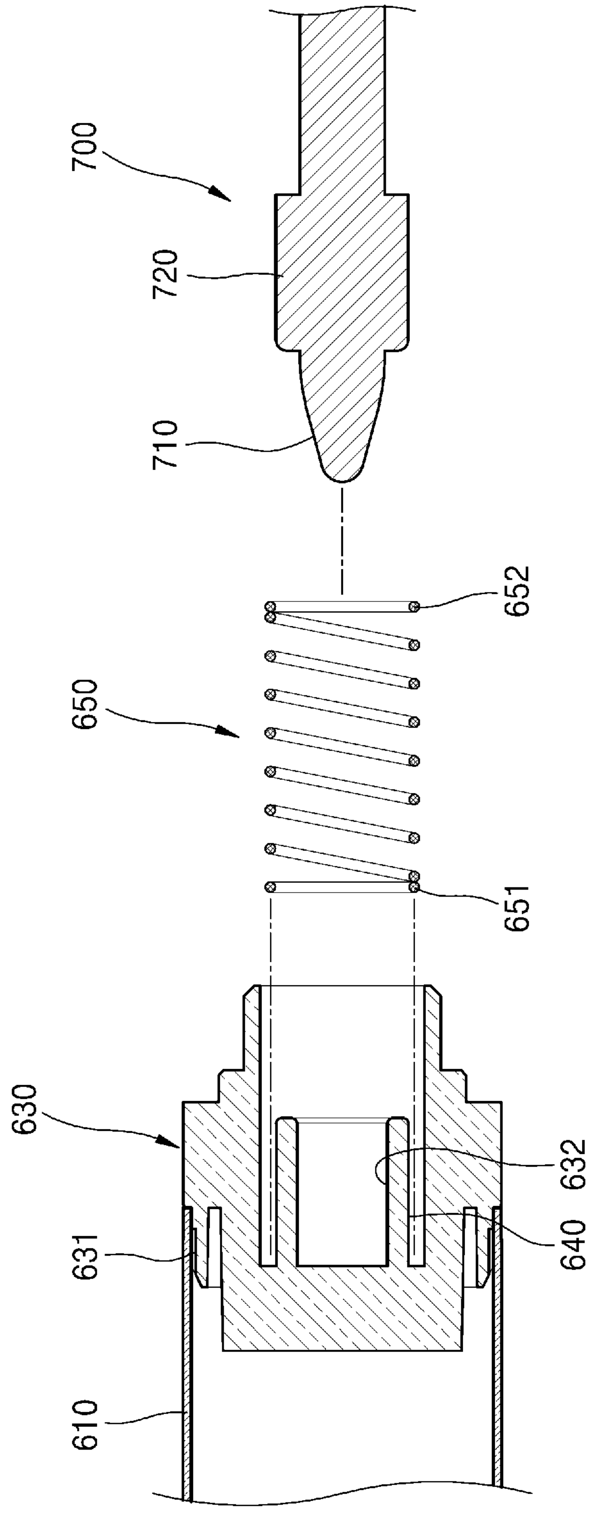
FIG. 4 is a cross-sectional view of the coupling structure shown in FIG. 3.
Figure 5:
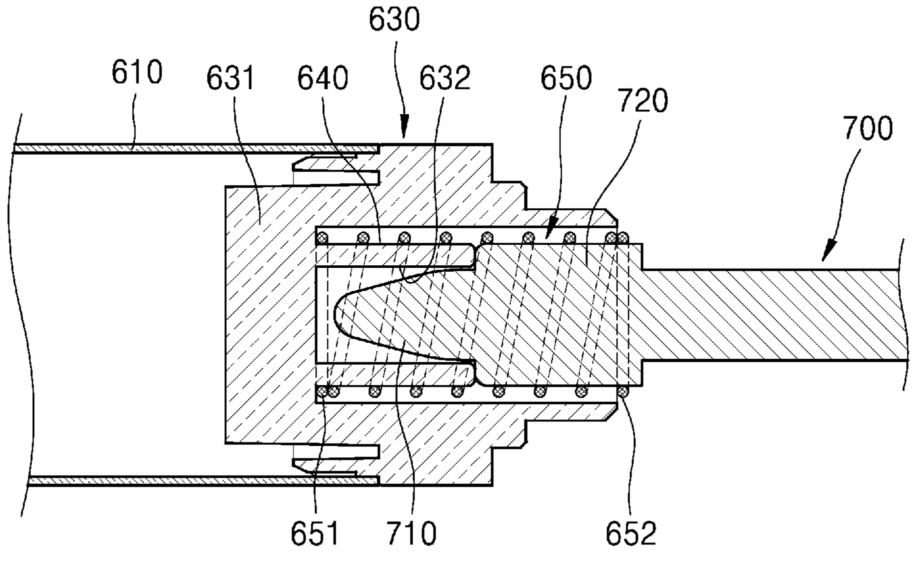
FIG. 5 is a cross-sectional view showing a state in which the coupling structure shown in FIG. 3 is coupled.

FIG. 3 is a perspective view of a coupling structure, according to the present example. In FIG. 3, the cartridge unit 600 may be a photosensitive unit (photosensitive cartridge), a developing unit (developing cartridge), an imaging cartridge or a toner container (toner cartridge) in which the photosensitive unit and the developing unit are integrated. FIG. 4 is a cross-sectional view of the coupling structure shown in FIG. 3. FIG. 5 is a cross-sectional view showing a state in which the coupling structure shown in FIG. 3 is coupled.

Referring to FIGS. 3 to 5, the cartridge unit 600 may include the rotation member 610 and the driven coupler 630 described above. The driven coupler 630 may receive a rotational force from the outside, for example, a driving coupler 700 provided on the main body 500 to rotate the rotation member 610.

The rotation member 610 may be a photosensitive drum. However, the rotation member 610 is not limited thereto. The rotation member 610 may be a component included in the cartridge unit 600 to be easily mounted on and removed from the main body 500, for example, a developing roller, an agitation member, or a gear that transmits a rotational force thereto. In other words, the rotation member 610 may be at least one of the photosensitive drum, the developing roller, the agitation member, and the gear that transmits a rotational force thereto.

The driven coupler 630 is arranged on one end portion of the rotation member 610 in an axial direction. The axial direction of the rotation member 610 may be a direction in which the cartridge unit 600 is mounted. The driven coupler 630 may be fixed to the rotation member 610 and may rotate the rotation member 610 by receiving a rotational force from the outside.

The driven coupler 630 includes a flange portion 631 fixed and coupled to the rotation member 610, and a coupling portion 632 extending in the axial direction of the rotation member 610 from the flange portion 631. The coupling portion 632 may have a hollow cylinder shape extending in the axial direction of the rotation member 610. The coupling portion 632 may be integrally formed with the flange portion 631.

The driving coupler 700 may be coupled and connected to the coupling portion 632 of the driven coupler 630. For example, the driving coupler 700 may include an insertion portion 710 inserted into the coupling portion 632, and a support 720 configured to support the insertion portion 710. The insertion portion 710 and the coupling portion 632 may be fitted and coupled to each other. A frictional force acts between the fitted insertion portion 710 and the coupling portion 632. For fitting, the insertion portion 710 may be slightly larger than or equal to an inner diameter of the coupling portion 632. The insertion portion 710 may have a diameter decreasing toward one end portion thereof to facilitate insertion into the coupling portion 632. When the driving coupler 700 and the driven coupler 630 are connected to each other, the driven coupler 630 and the rotation member 610 rotate by receiving a rotational force from the driving coupler 700.

Under ideal conditions, a rotational shaft of the driving coupler 700 and a rotational shaft of the driven coupler 630 are arranged coaxially with each other, and a rotational force of the driving coupler 700 is transmitted to the driven coupler 630. However, under actual conditions, due to various causes, such as manufacturing tolerances and assembly tolerances of the driving coupler 700 and the driven coupler 630, the rotational shaft of the driving coupler 700 and the rotational shaft of the driven coupler 630 may not be coaxially arranged. As a result, a driving force may not be properly transmitted from the main body 500 to the cartridge unit 600, and in some cases, a coupling structure or components connected thereto may be damaged. In order to overcome such issues, the cartridge unit 600 according to the some examples may further include a coil spring 650 configured to connect the driven coupler 630 to the driving coupler 700 or to supplement the connection.

The coil spring 650 is arranged to be expandable and compressible in the axial direction of the rotation member 610. A first end portion 651 of the coil spring 650 is fixed to the driven coupler 630. The driven coupler 630 may include a support 640 extending in the axial direction of the rotation member 610 and configured to support the coil spring 650 to be fixed. The support 640 may protrude in the axial direction of the rotation member 610 to be inserted into the coil spring 650. The support 640 and the coupling portion 632 may be integrally formed. For example, an outer circumferential surface of the coupling portion 632 for coupling with the driving coupler 700 may function as the support 640. However, an arrangement and configuration of the support 640 is not limited thereto, and various arrangements and configurations may be possible.

The coil spring 650 may be fixed onto an outer circumferential surface of the support 640 of the driven coupler 630. For example, the first end portion 651 of the coil spring 650 may be fitted and fixed to the outer circumferential surface of the support 640. A frictional force acts between the first end portion 651 of the coil spring 650 and the support 640. For fitting, a diameter of the coil spring 650 before being coupled to the support 640 may be slightly less than or equal to an outer diameter of the support 640.

The coil spring 650 has the first end portion 651 fixed to and supported by the support 640, and the other end portion (a second end portion) 652 located on an opposite side of the first end portion 651. The coil spring 650 is wound from the first end portion 651 toward the second end portion 652 in a first direction D1. Before being coupled to the driving coupler 700, the second end portion 652 of the coil spring 650 is not fixed and may be expanded and compressed.

Figure 6:
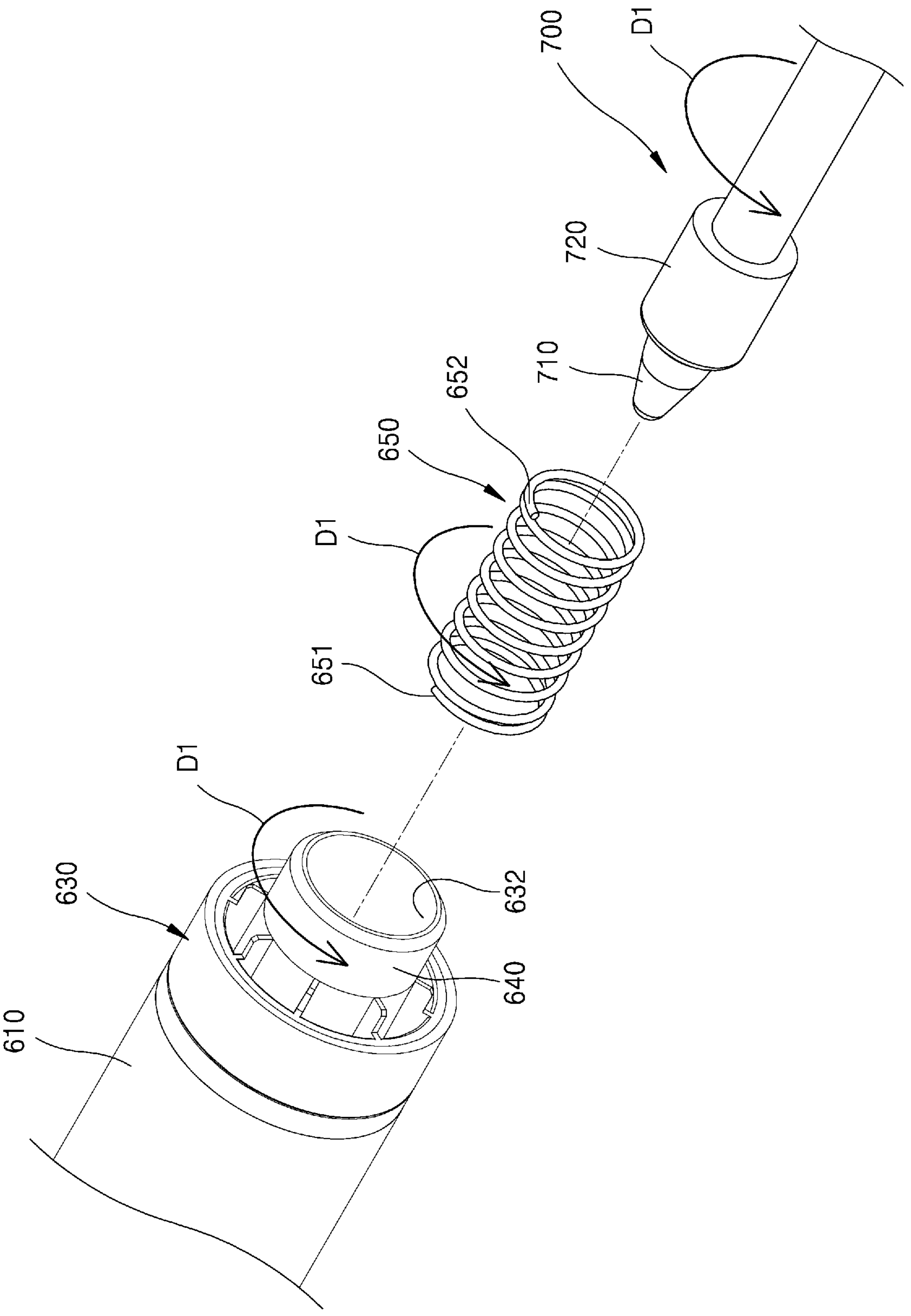
FIG. 6 is an exploded perspective view illustrating an operation of a coupling structure, according to the present example.
Figure 7:
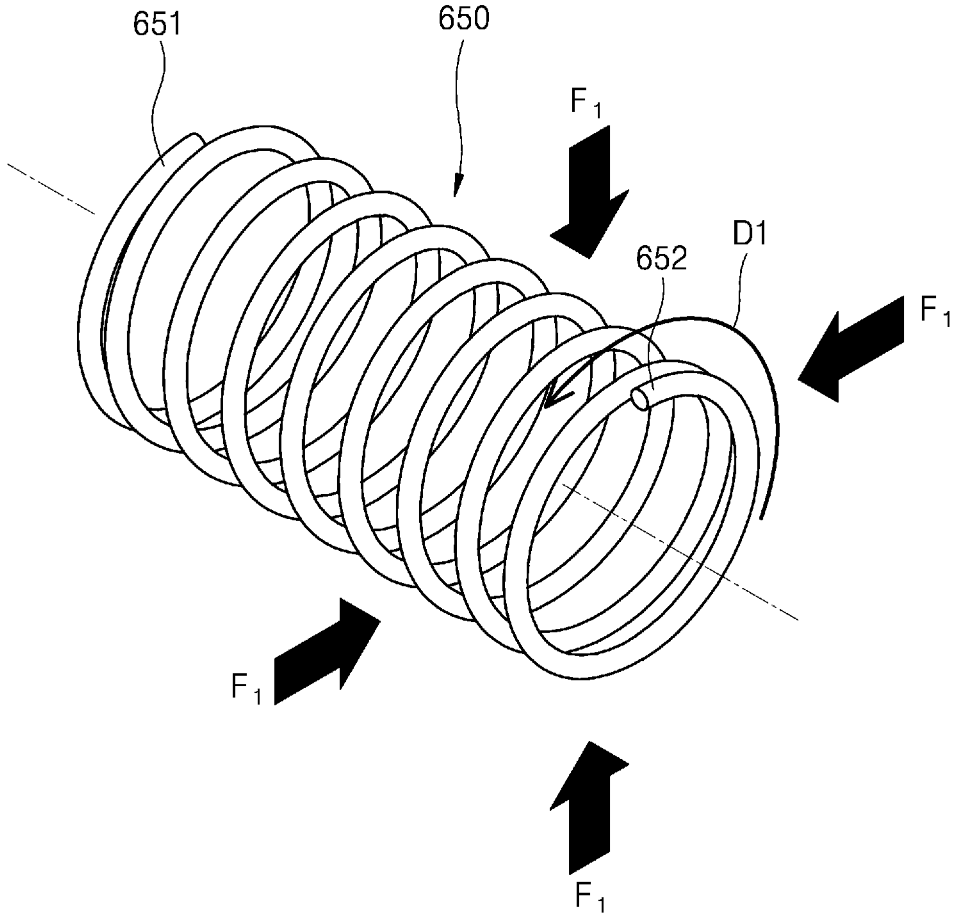
FIG. 7 is a perspective view illustrating a coil spring according, to the present example.

FIG. 6 is an exploded perspective view illustrating an operation of a coupling structure, according to the present example. FIG. 7 is a perspective view illustrating the coil spring 650, according to the present example, and FIG. 8 is a cross-sectional perspective view of a coupling structure illustrating an operation of the coil spring 650 of FIG. 7.

Figure 8:
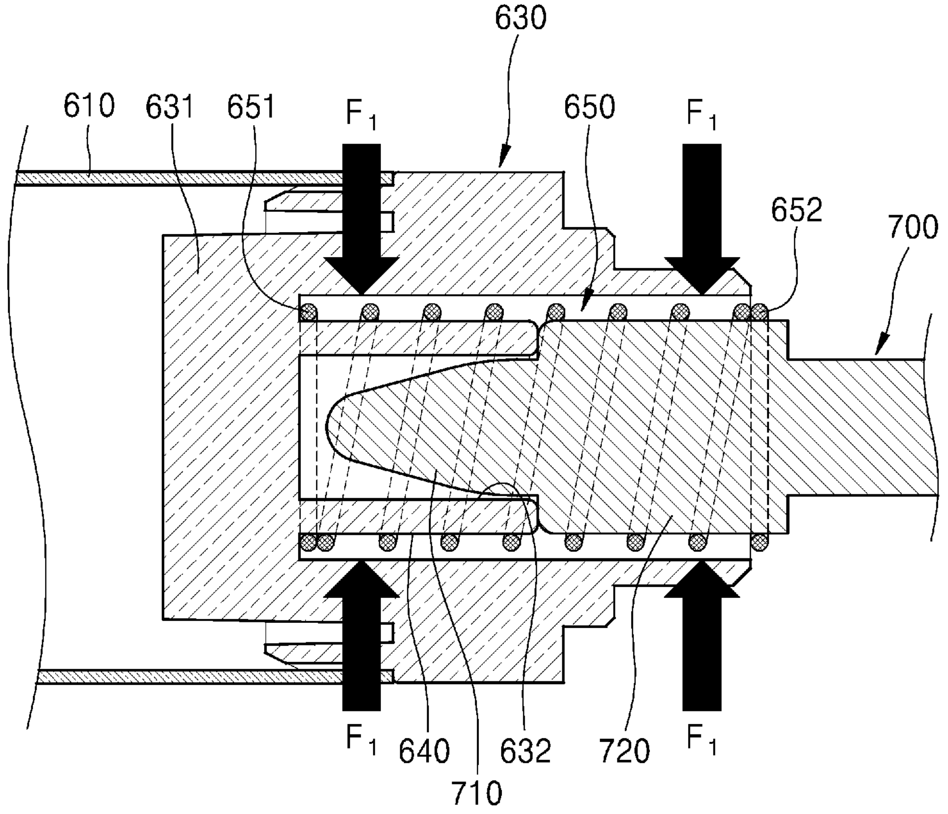
FIG. 8 is a cross-sectional perspective view of a coupling structure illustrating an operation of the coil spring of FIG. 7.

Referring to FIGS. 6 to 8, while the insertion portion 710 of the driving coupler 700 is coupled to the coupling portion 632 of the driven coupler 630, the second end portion 652 of the coil spring 650 is fixed onto the driving coupler 700. For example, the second end portion 652 of the coil spring 650 may be fixed onto the support 720 of the driving coupler 700. The second end portion 652 of the coil spring 650 may be fixed by being fitted to an outer circumferential surface of the support 720 of the driving coupler 700. A frictional force acts between the second end portion 652 of the coil spring 650 and the outer circumferential surface of the support 720. For fitting, a diameter of the coil spring 650 before being coupled to the support 720 may be slightly less than or equal to an outer diameter of the support 720.

While the driven coupler 630 and the driving coupler 700 are coupled to each other, when the driving coupler 700 rotates, the driven coupler 630 and the coil spring 650 that are fixed and connected to the driving coupler 700 rotate in the same direction as the driving coupler 700. A direction in which the driving coupler 700 rotates may be the same direction as the first direction D1 in which the coil spring 650 is wound. In that case, a rotational force is transmitted from the outside, for example, the driving coupler 700, to the second end portion 652 of the coil spring 650 in the first direction D1. Since the frictional force is acting between the coil spring 650 and the driving coupler 700 due to the fitting, the rotational force is transmitted to the coil spring 650 in the first direction D1 as shown in FIG. 7. Since the direction in which the driving coupler 700 rotates is the same direction as the first direction D1 in which the coil spring 650 is wound, some of the transmitted rotational force is converted into a force F1 that reduces the diameter of the coil spring 650. Therefore, the second end portion 652 of the coil spring 650 presses the driving coupler 700 in a direction perpendicular to an axial direction of the rotation member 610, and the first end portion 651 of the coil spring 650 presses the driven coupler 630 in the direction perpendicular to the axial direction of the rotation member 610. In other words, as shown in FIG. 8, some of the rotational force transmitted to the coil spring 650 in the first direction D1 is converted into the force F1 that reduces the diameter of the coil spring 650 to press an outer circumferential surface of the support 720 of the driving coupler 700 and an outer circumferential surface of the support 640 of the driven coupler 630. Due to the pressing of the coil spring 650, the frictional force acting between the second end portion 652 of the coil spring 650 and the support 720 increases, and the frictional force acting between the first end portion 651 of the coil spring 650 and the support 640 increases. In other words, since the rotational force is transmitted to the coil spring 650 in the first direction D1 and the coil spring 650 presses the outer circumferential surface of the support 720 of the driving coupler 700, the frictional force acting between the coil spring 650 and the support 720 increases. In addition, since the rotational force is transmitted to the coil spring 650 in the first direction D1 and the coil spring 650 presses the outer circumferential surface of the support 640 of the driven coupler 630, the frictional force acting between the coil spring 650 and the support 640 increases. Accordingly, a coupling force between the coil spring 650 and the driven coupler 630 increases, and a coupling force between the second end portion 652 of the coil spring 650 and the driving coupler 700 increases.

A coupling force between the driving coupler 700 and the driven coupler 630 may be supplemented by a pressing force of the coil spring 650. A force is applied in a direction perpendicular to a rotation axis of the driving coupler 700 and the driven coupler 630 by the coil spring 650. Therefore, even if the rotation axis of the driving coupler 700 and the rotation axis of the driven coupler 630 when assembled slightly deviate from a coaxial axis, the driving coupler 700 and the driven coupler 630 may be coaxially arranged.

In addition, the second end portion 652 of the coil spring 650 coupled to the driving coupler 700 receives a force while continuously surrounding an edge of the support 720 of the driving coupler 700, and the first end portion 651 of the coil spring 650 coupled to the driven coupler 630 transmits a force while continuously surrounding an edge of the support 640 of the driven coupler 630. As described above, since the coil spring 650 has a structure that transmits or receives force through the edges of the driving coupler 700 and the driven coupler 630 as a whole, damage due to concentration of force in some parts may be prevented.

Figure 9:
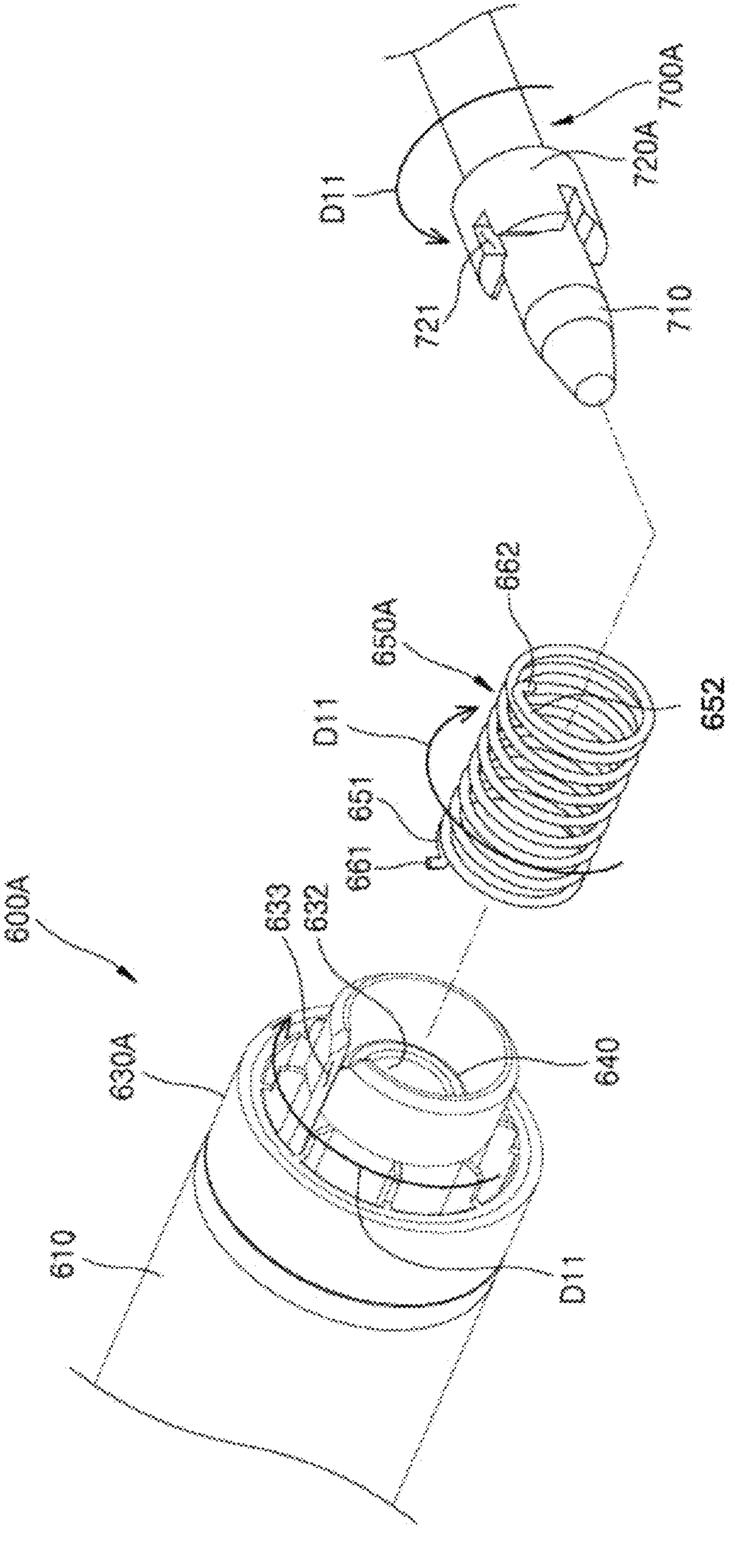
FIG. 9 is an exploded perspective view illustrating a coupling structure including a coil spring, according to another example.
Figure 10:
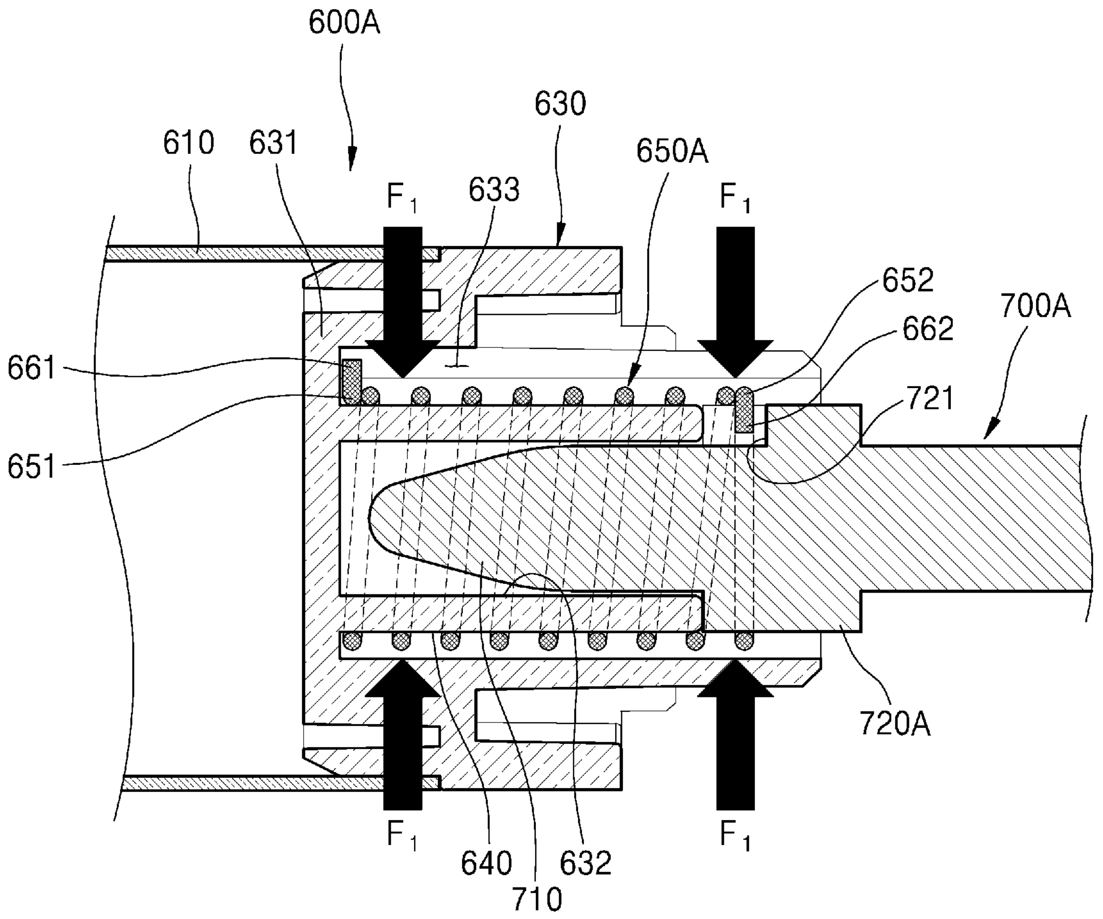
FIG. 10 is a cross-sectional view showing a state in which the coupling structure of FIG. 9 is assembled.

FIG. 9 is an exploded perspective view illustrating a coupling structure including a coil spring 650A, according to another example, and FIG. 10 is a cross-sectional view illustrating an assembled state of the coupling structure of FIG. 9.

Referring to FIGS. 9 and 10, a cartridge unit 600A according to examples of FIGS. 9 and 10 includes a driven coupler 630A and the coil spring 650A. Hereinafter, descriptions are mainly on differences between the cartridge unit 600A according to the examples of FIGS. 9 and 10 and the cartridge unit 600 described above, and redundant descriptions thereof are omitted.

The coil spring 650A may further include a first locking protrusion 661 for coupling with the driven coupler 630A. The first locking protrusion 661 may be arranged on the first end portion 651 of the coil spring 650A, and may protrude in a radial direction of the coil spring 650A. The driven coupler 630A includes a first locking groove 633 into which the first locking protrusion 661 is inserted. Since the first locking protrusion 661 is inserted into the first locking groove 633, a slip between the coil spring 650A and the driven coupler 630A may be prevented.

The coil spring 650A further includes a second locking protrusion 662 at the second end portion 652 for coupling with a driving coupler 700A. The driving coupler 700A includes a second locking groove 721 into which the second locking protrusion 662 is inserted in a support 720A. Since the second locking protrusion 662 is inserted into the second locking groove 721, when the driving coupler 700A rotates, a slip between the driving coupler 700A and the coil spring 650A may be prevented.

While the first end portion 651 of the coil spring 650A is fixed onto the support 640, and the first locking protrusion 661 of the coil spring 650A is inserted into the first locking groove 633 of the driven coupler 630, the driven coupler 630 and the driving coupler 700 are coupled to each other. While the driven coupler 630A and the driving coupler 700A are coupled to each other, the second end portion 652 of the coil spring 650A is fixed onto the support 720A, and the second locking protrusion 662 is inserted into the second locking groove 721. In that state, while the driving coupler 700A rotates in a first direction D11, which is the direction in which the coil spring 650A is wound, a rotational force is transmitted to the second end portion 652 of the coil spring 650A in the first direction D11, and a portion of the transmitted rotational force is converted into the force F1 that reduces a diameter of the coil spring 650A. Therefore, the second end portion 652 of the coil spring 650A tightens onto the support 720A of the driving coupler 700A, thereby increasing a coupling force between the coil spring 650A and the driving coupler 700A. The first end portion 651 of the coil spring 650A presses the driven coupler 630A in a direction perpendicular to an axial direction of the rotation member 610. The first end portion 651 of the coil spring 650A tightens onto the support 640 of the driven coupler 630A, thereby increasing a coupling force between the coil spring 650A and the driven coupler 630A.

The above-described examples describe that a rotational force is transmitted to the second end portion 652 of the coil springs 650 and 650A in the first directions D1 and D11, respectively, and the transmitted rotational force is converted into a force that reduces the diameter of the coil springs 650 and 650A. However, the coil springs 650 and 650A according to some examples are not limited thereto, and a force may be applied in an opposite direction to strengthen a coupling force of the coupler structure. In other words, in the cartridge unit 600 or 600A according to some examples, when a rotational force is transmitted to the second end portion 652 of the coil spring 650 or 650A from the outside in the first directions D1 or D11 or in the second direction, which is the opposite direction of the first direction D1 or D11, a portion of the transmitted rotational force may be converted into a force to decrease or increase the diameter of the coil spring 650 or 650A, so that the first end portion 651 of the coil spring 650 or 650A may press the driven coupler 630 or 630A in a direction perpendicular to the axial direction of the rotation member 610.

Figure 11:
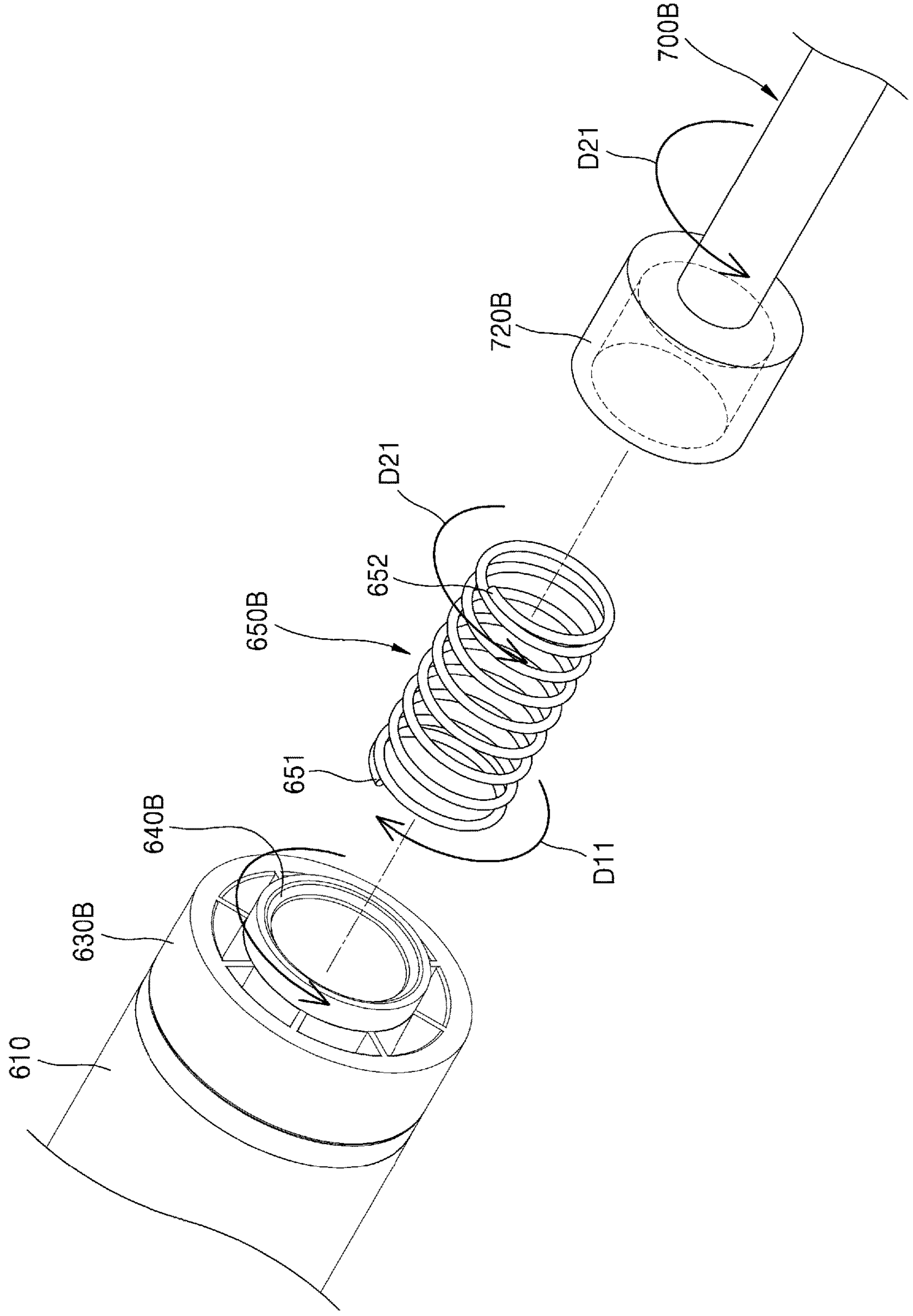
FIG. 11 is an exploded perspective view of a coupling structure, according to another example.
Figure 12:
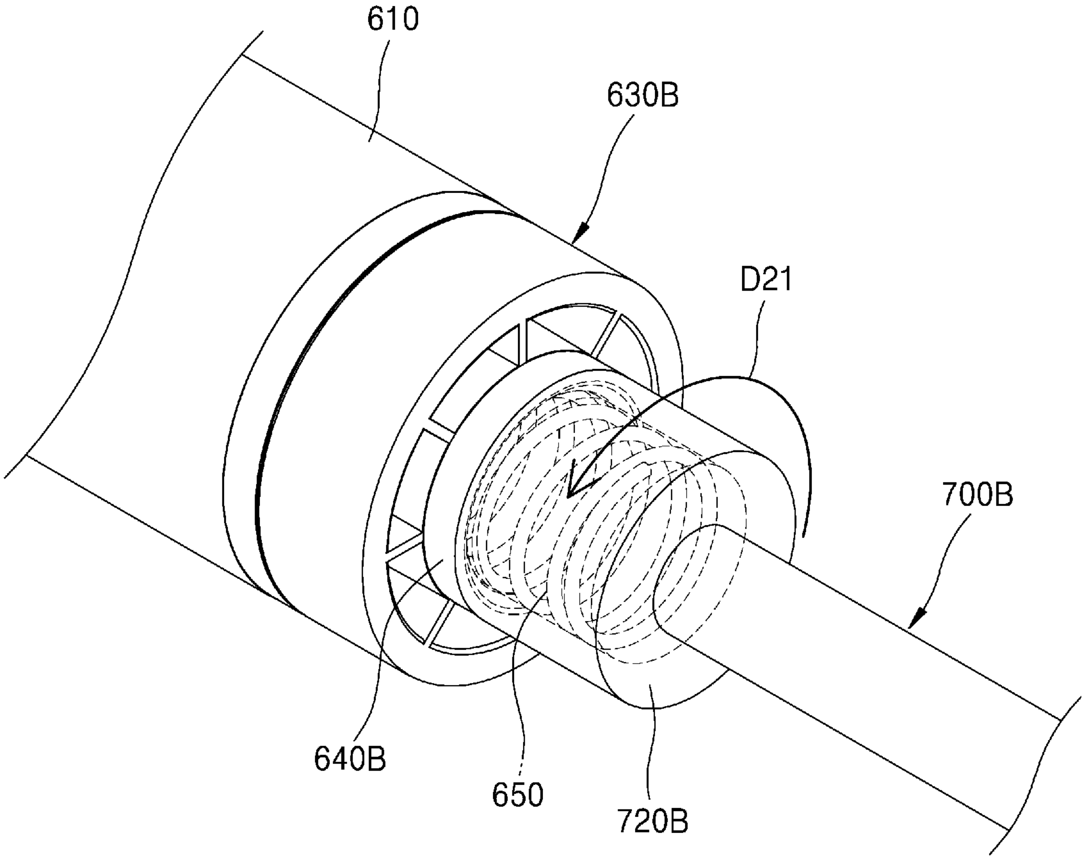
FIG. 12 is an assembled perspective view of the coupling structure of FIG. 11.
Figure 13:
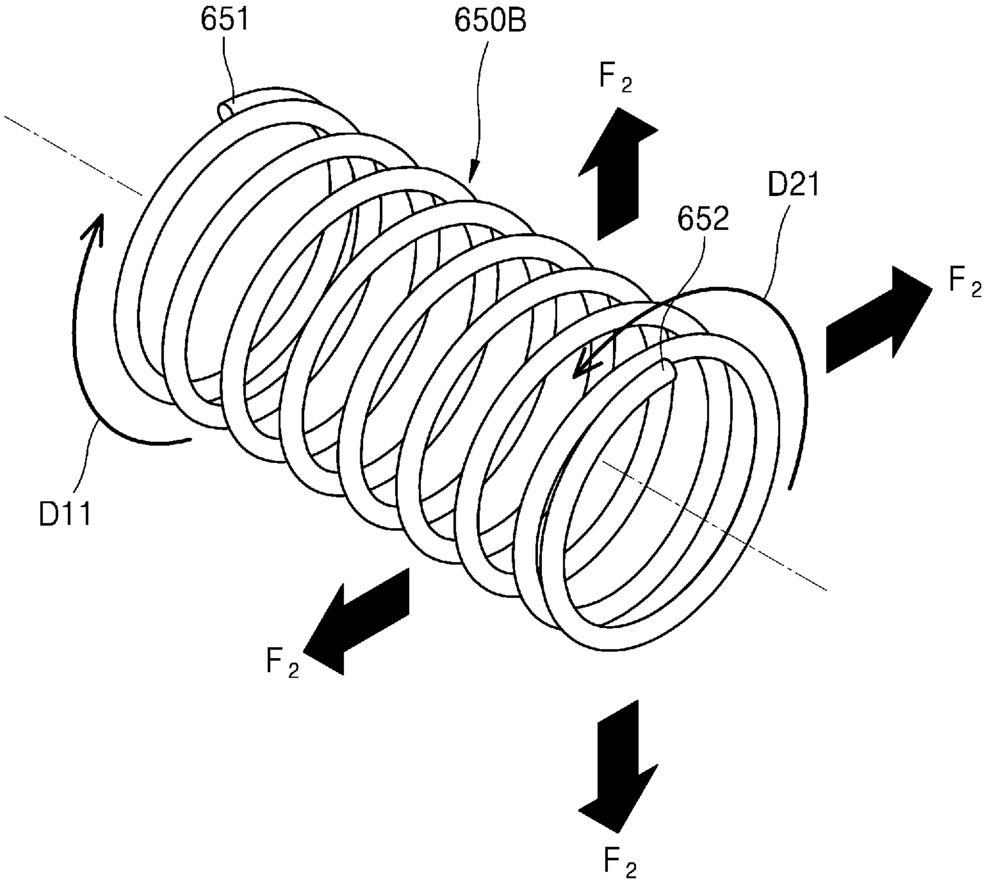
FIG. 13 is a perspective view illustrating an operation of the coil spring of FIG. 11.
Figure 14:
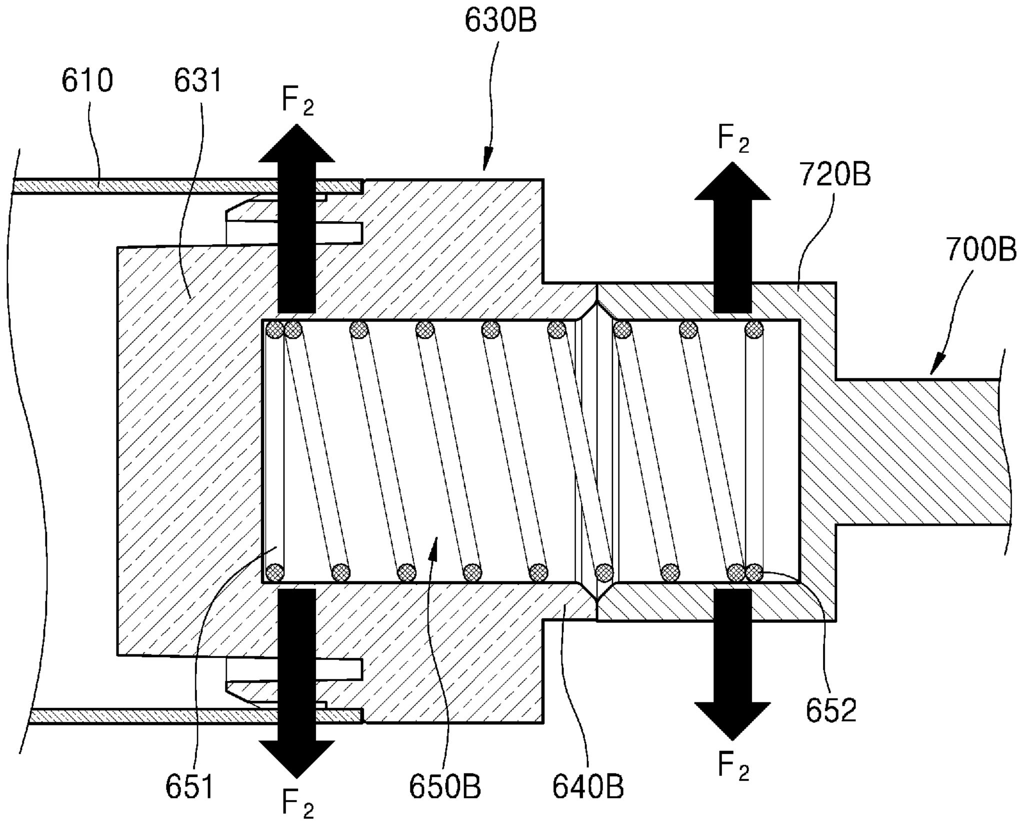
FIG. 14 is a cross-sectional view illustrating the operation of the coil spring of FIG. 11.

FIG. 11 is an exploded perspective view of a coupling structure, according to another example, and FIG. 12 is an assembled perspective view of the coupling structure of FIG. 11. FIG. 13 is a perspective view illustrating an operation of a coil spring 650B of FIG. 11, and FIG. 14 is a cross-sectional view illustrating the operation of the coil spring 650B of FIG. 11.

Referring to FIGS. 11 to 14, a driven coupler 630B includes the flange portion 631 fixed onto the rotation member 610, and a support 640B extending in an axial direction of the rotation member 610 from the flange portion 631. The support 640B may have a cylindrical shape that surrounds the coil spring 650B. The support 640B may extend in the axial direction of the rotation member 610. The support 640B may be formed integrally with the flange portion 631.

The first end portion 651 of the coil spring 650B may be inserted into the support 640B of the driven coupler 630B to be fixed and supported. The first end portion 651 of the coil spring 650B may be inserted into the support 640B to be fitted. A frictional force acts between the first end portion 651 of the coil spring 650B and an inner circumferential surface of the support 640B. For fitting, a diameter of the first end portion 651 of the coil spring 650B may be slightly greater than or equal to an inner diameter of the support 640B.

A driving coupler 700B may be connected to the support 640B of the driven coupler 630B. For example, the driving coupler 700B may include a support 720B connected to the support 640B of the driven coupler 630B. The support 720B may have a hollow cylindrical shape. The second end portion 652 of the coil spring 650B may be inserted into and coupled to the support 720B of the driving coupler 700B. The second end portion 652 of the coil spring 650B may be inserted into the support 720B to be fitted. A frictional force acts between the second end portion 652 of the coil spring 650B and an inner circumferential surface of the support 720B. For fitting, a diameter of the second end portion 652 of the coil spring 650B may be slightly greater than or equal to an inner diameter of the support 720B.

The driving coupler 700B and the driven coupler 630B may be connected to each other by the coil spring 650B. Therefore, a rotational force of the driving coupler 700B is transmitted to the driven coupler 630B through the coil spring 650B, and the rotation member 610 fixed onto the driven coupler 630B rotates.

A direction in which the driving coupler 700B rotates may be a second direction D21 opposite to the first direction D11, in which the coil spring 650B is wound. While a frictional force is applied between the driving coupler 700B and the second end portion 652 of the coil spring 650B, when the driving coupler 700B rotates in the second direction D21, a rotational force is transmitted in the second direction D21 to the second end portion 652 of the coil spring 650B coupled to the driving coupler 700B. Some of the transmitted rotational force is converted into a force F2 that increases a diameter of the coil spring 650B as shown in FIG. 13. While the force F2 that increases the diameter of the coil spring 650B acts on the coil spring 650B, the second end portion 652 of the coil spring 650B presses the driving coupler 700B in a direction perpendicular to an axial direction of the rotation member 610, and the first end portion 651 of the coil spring 650B presses the driven coupler 630B in the direction perpendicular to the axial direction of the rotation member 610. When a rotational force is transmitted to the second end portion 652 of the coil spring 650B in the second direction D21, some of the transmitted rotational force is converted into the force F2 that increases the diameter of the coil spring 650B and presses an inner circumferential surface of the support 640B of the driven coupler 630B and an inner surface of the support 720B of the driving coupler 700B. Therefore, the first end portion 651 of the coil spring 650B is in close contact with the support 640B of the driven coupler 630B, and the second end portion 652 of the coil spring 650B is in close contact with the support 720B of the driving coupler 700B. Due to the pressing of the coil spring 650B, the frictional force acting between the second end portion 652 of the coil spring 650B and the support 720B increases, and the frictional force acting between the first end portion 651 of the coil spring 650B and the support 640B increases. Since a rotational force is transmitted to the coil spring 650B in the second direction D21, the coil spring 650B presses the inner circumferential surface of the support 720B of the driving coupler 700B. Therefore, the frictional force acting between the coil spring 650B and the support 720B increases. Since a rotational force is transmitted to the coil spring 650B in the second direction D21, the coil spring 650B presses the inner circumferential surface of the support 640B of the driven coupler 630B. Therefore, the frictional force acting between the coil spring 650B and the support 640B increases. Accordingly, a coupling force between the first end portion 651 of the coil spring 650B and the driven coupler 630B increases, and a coupling force between the second end portion 652 of the coil spring 650B and the driving coupler 700B increases.

Figure 15:
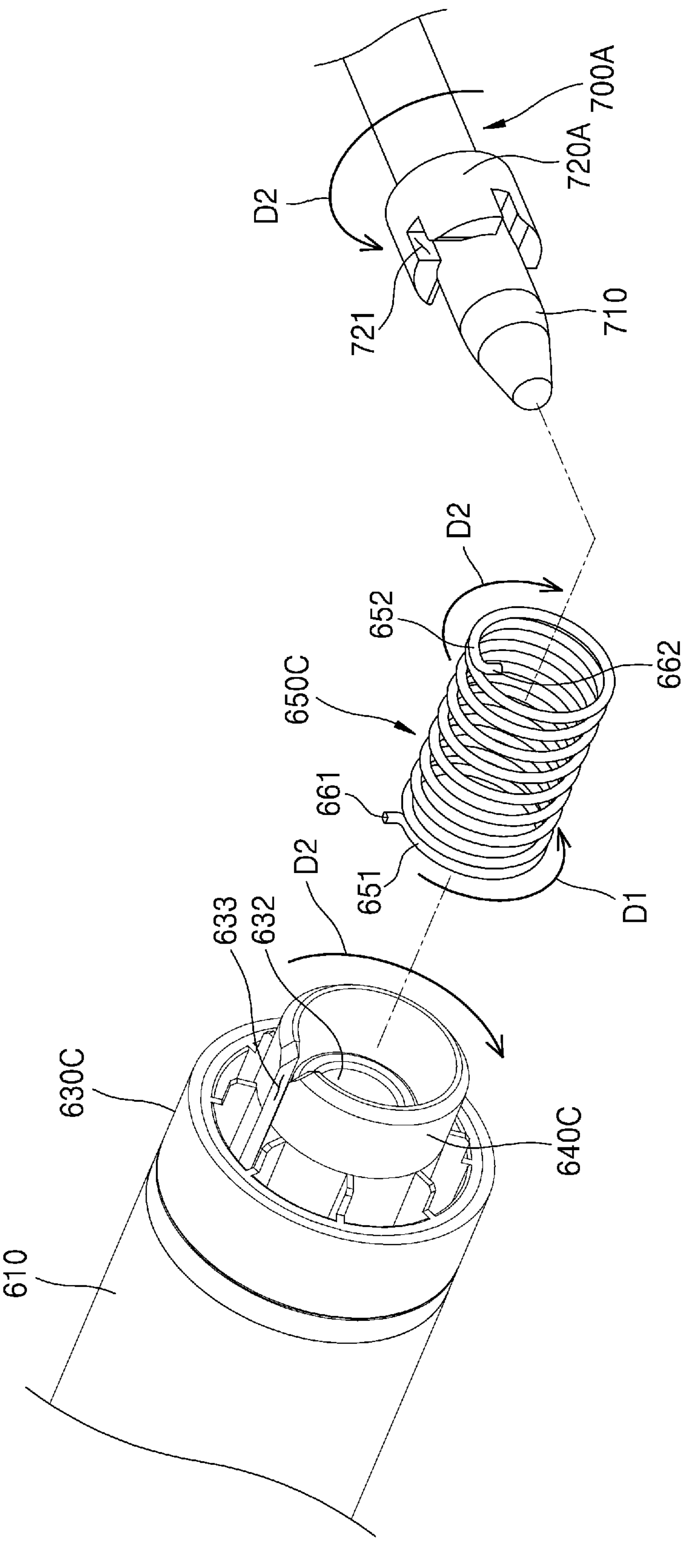
FIG. 15 is an exploded perspective view of a coupling structure, according to another example.
Figure 16:
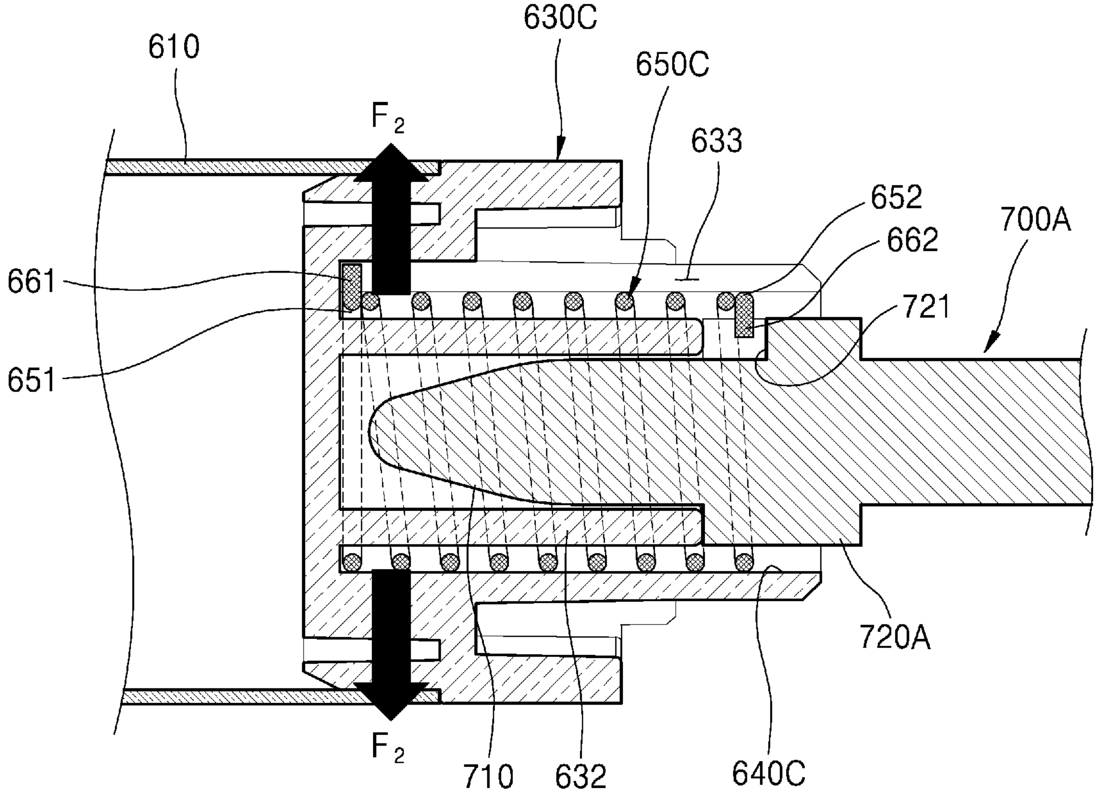
FIG. 16 is a cross-sectional view illustrating an operation of a coil spring of FIG. 15.

FIG. 15 is an exploded perspective view of a coupling structure, according to another example, and FIG. 16 is a cross-sectional view illustrating an operation of a coil spring 650C of FIG. 15.

Referring to FIGS. 15 and 16, the coil spring 650C according to the present example may include the first locking protrusion 661 for coupling with a driven coupler 630C. The first locking protrusion 661 may be arranged on the first end portion 651 of the coil spring 650C, and may protrude in a radial direction of the coil spring 650C. The driven coupler 630C includes the first locking groove 633 into which the first locking protrusion 661 is inserted. Since the first locking protrusion 661 is inserted into the first locking groove 633, a slip between the coil spring 650C and the driven coupler 630C may be prevented.

The coil spring 650C further includes the second locking protrusion 662 on the second end portion 652 for coupling with the driving coupler 700A. The support 720A of the driving coupler 700A includes the second locking groove 721 into which the second locking protrusion 662 is inserted. Since the second locking protrusion 662 is inserted into the second locking groove 721, in a case where the driving coupler 700A rotates, a slip between the driving coupler 700A and the coil spring 650C may be prevented.

While the first end portion 651 of the coil spring 650C is fixed onto a support 640C, and the first locking protrusion 661 of the coil spring 650C is inserted into the first locking groove 633 of the driven coupler 630C, the driven coupler 630C and the driving coupler 700A are coupled to each other. While the driven coupler 630C and the driving coupler 700A are coupled to each other, the second end portion 652 of the coil spring 650C is fixed onto the support 720A, and the second locking protrusion 662 is inserted into the second locking groove 721. The first end portion 651 of the coil spring 650C may be fixed onto an inner circumferential surface of the support 640C by fitting, and the second end portion 652 of the coil spring 650C may be fixed onto an outer circumferential surface of the support 720A by fitting.

In that state, while the driving coupler 700A rotates in the second direction D2 opposite to the first direction D1, in which the coil spring 650C is wound, a rotational force is transmitted to the other end portion 652 of the coil spring 650C in the second direction D2, and some of the transmitted rotational force is converted into the force F2 that increases a diameter of the coil spring 650C. Accordingly, the first end portion 651 of the coil spring 650C presses the driven coupler 630C in a direction perpendicular to an axial direction of the rotation member 610. The first end portion 651 of the coil spring 650C tightens the support 640C of the driven coupler 630C, thereby increasing a coupling force between the coil spring 650C and the driven coupler 630C.

According to some examples described above (e.g., FIGS. 3-8), it has been described that while the first end portion 651 and the second end portion 652 of the coil spring 650 are fitted into the support 640 of the driven coupler 630 and the support 720 of the driving coupler 700, respectively, and coupled by a frictional force, the first locking protrusion 661 and the second locking protrusion 662 are caught by the first locking groove 633 and the second locking groove 721, respectively, and thus, the coil spring 650 is fixed to and supported on the driven coupler 630 and the drive coupler 700. However, instead of being fitted or coupled by a frictional force, the coil spring 650 may be fixed onto and supported on the driven coupler 630 and the driving coupler 700, as the first locking protrusion 661 and the second locking protrusion 662 are caught by the first locking groove 633 and the second locking groove 721, respectively. In addition, the cartridge unit 600 employed in a monochromatic image forming device is exemplified in the above-described examples. However, examples of the present disclosure are not limited thereto. For example, the cartridge unit 600 according to the present examples may be employed in a color image forming device.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A cartridge unit detachable from a main body of an image forming device, the cartridge unit comprising:
- a rotation member;
- a driven coupler arranged at an end portion of the rotation member in an axial direction of the rotation member; and
- a coil spring arranged to be expandable and compressible in the axial direction of the rotation member, wherein a first end portion of the coil spring is fixed onto the driven coupler, the coil spring being wound from the first end portion toward a second end portion of the coil spring in a first direction,
- wherein, when a rotational force is transmitted from an outside of the cartridge unit to the second end portion of the coil spring in the first direction or in a second direction opposite to the first direction, a portion of the transmitted rotational force is converted into a force that decreases or increases a diameter of the coil spring, and the first end portion of the coil spring presses the driven coupler in a direction perpendicular to the axial direction of the rotation member.

2. The cartridge unit of claim 1, wherein the driven coupler comprises a support extending in the axial direction of the rotation member and supporting the coil spring.

3. The cartridge unit of claim 2, wherein the support protrudes in the axial direction of the rotation member so as to be inserted into the coil spring.

4. The cartridge unit of claim 3, wherein, when the rotational force is transmitted to the second end portion of the coil spring in the first direction, the portion of the transmitted rotational force is converted into the force that decreases the diameter of the coil spring, thereby pressing an outer circumferential surface of the support.

5. The cartridge unit of claim 4, wherein the first end portion of the coil spring is fitted onto the outer circumferential surface of the support, and a frictional force is provided between the coil spring and the support, and
- when the rotational force is transmitted to the coil spring in the first direction, the coil spring presses the outer circumferential surface of the support and the frictional force between the coil spring and the support increases.

6. The cartridge unit of claim 2, wherein the support has a cylindrical shape that surrounds the coil spring.

7. The cartridge unit of claim 6, wherein when the rotational force is transmitted to the second end portion of the coil spring in the second direction, the portion of the transmitted rotational force is converted into the force that increases the diameter of the coil spring, and presses an inner circumferential surface of the support of the driven coupler.

8. The cartridge unit of claim 7, wherein the first end portion of the coil spring is inserted and fitted into the support, and a frictional force is provided between the coil spring and the support, and
- when the rotational force is transmitted to the coil spring in the second direction, the coil spring presses the inner circumferential surface of the support and the frictional force between the coil spring and the support increases.

9. The cartridge unit of claim 1, wherein the main body of the image forming device comprises a driving coupler,
- the driving coupler is fixed to transmit the rotational force to the second end portion of the coil spring, and
- when the rotational force is transmitted from the driving coupler to the second end portion of the coil spring in the first direction or in the second direction, the portion of the transmitted rotational force is converted into the force that decreases or increases the diameter of the coil spring, and the second end portion of the coil spring presses the driving coupler in a direction perpendicular to the axial direction of the rotation member.

10. The cartridge unit of claim 1, wherein the first end portion of the coil spring comprises a first locking protrusion to protrude in a radial direction of the rotation member, and
- the driven coupler comprises a first locking groove into which the first locking protrusion is inserted.

11. The cartridge unit of claim 1, wherein the rotation member is at least one of a photosensitive drum, a developing roller, an agitation member, or a gear.

12. An image forming device comprising:
- a main body; and
- a cartridge unit detachably installed in the main body, wherein the cartridge unit comprises:
  - a rotation member;
  - a driven coupler arranged at one end portion of the rotation member; and
  - a coil spring capable of being expanded and compressed in an axial direction of the rotation member, wherein a first end portion of the coil spring is fixed onto the driven coupler, the coil spring being wound in a first direction from the first end portion toward a second end portion of the coil spring, wherein the main body comprises a driving coupler to transmit a rotational force to the cartridge unit, and when the rotational force is transmitted from the driving coupler to the second end portion of the coil spring in the first direction or in a second direction opposite to the first direction, the transmitted rotational force is converted into a force that decreases or increases a diameter of the coil spring, the second end portion of the coil spring presses the driving coupler in a direction perpendicular to the axial direction of the rotation member, and the first end portion of the coil spring presses the driven coupler in the direction perpendicular to the axial direction of the rotation member.

13. The image forming device of claim 12, wherein the driven coupler comprises a support extending in the axial direction of the rotation member and supporting the coil spring to be fixed.

14. The image forming device of claim 13, wherein the support protrudes in the axial direction of the rotating member so as to be inserted into the coil spring, and when the rotational force is applied to the second end portion of the coil spring in the first direction, the transmitted rotational force is converted into the force that reduces the diameter of the coil spring, and presses an outer circumferential surface of the support.

15. The image forming device of claim 13, wherein the support has a cylindrical shape that surrounds the coil spring, and when the rotational force is transmitted to the second end portion of the coil spring in the second direction, the transmitted rotational force is converted into the force that increases the diameter of the coil spring, and presses an inner circumferential surface of the support.

* * * * *